(12) United States Patent
Batenburg (10) Patent No.: US 11,092,226 B2
(45) Date of Patent: Aug. 17, 2021

(54) CHAIN WHEEL

(71) Applicant: Joz B.V., Westwoud (NL)

(72) Inventor: Ronald Batenburg, Den Helder (NL)

(73) Assignee: JOZ B.V., Westwoud (NL)

( * ) Notice: Subject to any disclaimer, the term of this patent is extended or adjusted under 35 U.S.C. 154(b) by 250 days.

(21) Appl. No.: 16/316,216

(22) PCT Filed: Jul. 10, 2017

(86) PCT No.: PCT/NL2017/050460
§ 371 (c)(1),
(2) Date: Jan. 8, 2019

(87) PCT Pub. No.: WO2018/009072
PCT Pub. Date: Jan. 11, 2018

(65) Prior Publication Data
US 2020/0088287 A1    Mar. 19, 2020

(30) Foreign Application Priority Data

Jul. 8, 2016  (NL) ........................................ 2017134

(51) Int. Cl.
*F16H 55/30*  (2006.01)
*A01K 1/01*  (2006.01)

(52) U.S. Cl.
CPC ......... *F16H 55/303* (2013.01); *A01K 1/0132* (2013.01); *F16H 2055/306* (2013.01)

(58) Field of Classification Search
CPC .... F16H 2055/306; F16H 55/30; F16H 55/14; B62D 55/0963; Y10S 474/901; Y10S 474/902

USPC .......................................................... 474/94
See application file for complete search history.

(56) References Cited

U.S. PATENT DOCUMENTS

| | | | | |
|---|---|---|---|---|
| 740,445 | A | * | 10/1903 | Langerfeld ............. F16H 55/30 474/152 |
| 1,390,198 | A | * | 9/1921 | Fossati .................... F16H 55/12 74/460 |
| 2,198,787 | A | * | 4/1940 | Nystrom ................. F16H 55/36 474/168 |
| 2,365,544 | A | * | 12/1944 | Geyer ..................... F16H 55/30 474/161 |
| 3,257,860 | A | * | 6/1966 | Runde ..................... F16H 55/30 474/94 |
| 4,141,602 | A | * | 2/1979 | Boggs ................ B62D 55/0963 267/182 |

(Continued)

FOREIGN PATENT DOCUMENTS

| | | |
|---|---|---|
| DE | 2914127 B1 | 8/1980 |
| EP | 0599156 A1 | 6/1994 |
| FR | 1433861 A | 4/1966 |

OTHER PUBLICATIONS

International Search Report and Written Opinion for the International Patent Application No. PCT/NL2017/050460, dated Oct. 18, 2017, 10 pages.

*Primary Examiner* — Henry Y Liu
(74) *Attorney, Agent, or Firm* — Kacvinsky Daisak Bluni PLLC (57) ABSTRACT

A chain wheel includes a body and protrusions extending outward along the periphery of the body for receiving links of a chain. The protrusions are connected releasably to the body and are spring-mounted independently of each other in a peripheral direction relative to the body.

9 Claims, 10 Drawing Sheets

(56) References Cited

U.S. PATENT DOCUMENTS

| | | | | |
|---|---|---|---|---|
| 4,332,573 A * | 6/1982 | Uchida | B62D 55/0963 | 474/94 |
| 4,486,183 A * | 12/1984 | Posiviata | F16D 3/68 | 267/148 |
| 4,585,431 A * | 4/1986 | Umeda | B62D 55/0963 | 474/161 |
| 4,752,281 A * | 6/1988 | Lammers | B62D 55/0963 | 474/161 |
| 4,881,930 A * | 11/1989 | Oertley | B62D 55/0963 | 474/162 |
| 5,026,329 A * | 6/1991 | Diekevers | B62D 55/0963 | 474/162 |
| 5,069,654 A * | 12/1991 | Rampe | F16H 57/0025 | 474/161 |
| 5,203,861 A * | 4/1993 | Irwin | B65G 23/06 | 474/161 |
| 5,443,425 A * | 8/1995 | Korenberg | F16H 55/52 | 474/163 |
| 6,109,227 A * | 8/2000 | Mott | F16H 7/06 | 123/192.2 |
| 6,161,512 A * | 12/2000 | Beels Van Heemstede | F16F 15/1232 | 123/192.1 |
| 6,283,076 B1 * | 9/2001 | Simpson | F16H 7/06 | 123/192.1 |
| 6,581,756 B2 * | 6/2003 | Romeu Guardia | A01K 5/0258 | 198/716 |
| 6,899,651 B2 * | 5/2005 | Oertley | F16H 55/12 | 305/137 |
| 8,360,535 B2 * | 1/2013 | Johannsen | B62D 55/0966 | 305/137 |
| 8,764,593 B2 * | 7/2014 | Grobbel | F16H 55/30 | 474/94 |
| 9,879,752 B1 * | 1/2018 | Hicken | F16H 55/14 | |
| 2005/0075206 A1 * | 4/2005 | Kabrich | B62D 55/12 | 474/162 |
| 2007/0021249 A1 * | 1/2007 | Shao | F16H 55/30 | 474/94 |
| 2007/0093329 A1 * | 4/2007 | Greppi | F16F 15/124 | 474/152 |
| 2009/0093329 A1 * | 4/2009 | Markley | F16H 55/30 | 474/161 |
| 2011/0079098 A1 * | 4/2011 | Nowicki | F16H 55/16 | 74/411 |
| 2014/0206486 A1 * | 7/2014 | Fuchs | F16H 55/30 | 474/161 |
| 2015/0353289 A1 * | 12/2015 | Pellman | A01K 1/0132 | 198/728 |

* cited by examiner

CHAIN WHEEL

This is a national stage application filed under 35 U.S.C. § 371 of pending international application PCT/NL2017/050460 filed Jul. 10, 2017, which claims priority to Netherlands Patent application NL 2017134, filed Jul. 8, 2016, the entirety of which applications are hereby incorporated by reference herein.

The present invention relates to a chain wheel comprising a body and protrusions extending outward along the periphery of the body for receiving links of a chain. The invention also relates to a chain wheel suitable and intended for a manure slide device. The present invention finally relates to a manure slide device and a livestock accommodation.

Chain wheels generally function as transmission member between a drive member and a chain, which in turn drives an object for driving connected thereto. Chain wheels have a wide range of applications nowadays. They are used, among other purposes, in the shipping industry on ship anchor winches. They are also applied in manure slide devices for sliding manure over floors of manual passages in livestock accommodations. A slide member of such a manure slide device is moved here over an accommodation floor of a manure passage by means of an optionally motor-driven chain wheel and a part of a chain received thereon or therein. Great forces can be transmitted by means of such a chain transmission substantially without slip from a drive member to an object for driving.

In currently known chain transmissions however, said great forces cause wear to both the chain and the chain wheel, this resulting in slippage or the chain coming off the chain wheel.

It is an object of the invention to realize a more wear-resistant and therefore more reliable chain transmission.

The invention provides for this purpose a chain wheel of the type stated in the preamble with the special feature that the protrusions are connected releasably to the body and are spring-mounted independently of each other in a peripheral direction relative to the body. Because of the possibly great forces exerted thereon, the chain links wear and a chain becomes longer. The protrusions of currently known chain wheels also wear at their contact surface with the chain links. Since the links and protrusions each display an individual and mutually differing degree of wear, after use which is prolonged or otherwise local discrepancies occur in currently known chain wheels between the pitch of the links and the pitch of the protrusions. As a result a force is exerted on some protrusions and links lying thereon which is greater than on other protrusions and links lying thereon, resulting in further wear to the protrusions and links and/or in the chain falling or springing off the chain wheel. Because the protrusions of the chain wheel according to the present invention are spring-mounted independently of each other in a peripheral direction relative to a body of the chain wheel, the protrusions of the chain wheel adjust themselves to the chain links such that the pitch between adjacent protrusions corresponds to the pitch between adjacent links received by these protrusions. The mutually independent spring-mounting is of great importance, since the pitch between a first link and a second link lying directly adjacently thereof can differ from the pitch between the second link and a third link lying directly adjacently thereof. At the same time the protrusions produce sufficient reactive force by means of spring force in order to transmit the great active force of a drive member on the chain wheel to the chain. Such a chain wheel therefore ensures that the forces to be transmitted to the chain are uniformly distributed over the protrusions of the chain wheel which are in contact with links of the chain. Wear to the protrusions of the chain wheel and/or the links of the chain is hereby reduced. The mutual distance between adjacent protrusions also continues to match the mutual distance between adjacent links received thereon/therein. This prevents the chain springing off the wheel due to the reactive force or the weight of the object for driving. Wear to the chain links and the protrusions is on the one hand reduced, while on the other the protrusions adjust themselves to a possible local increase in the mutual distance between the links of the chain such that the forces to be transmitted to the chain continue to be uniformly distributed over the protrusions, and the links run over the chain wheel while centred in and/or on the protrusions. A particular advantage of releasably arranged protrusions is that the protrusions can be detached from the body for maintenance, repair or replacement thereof. It is noted that a chain wheel is understood to mean any rotatable body suitable for driving a chain, such as a nest wheel or a gear ring and the like. The protrusions are preferably configured to receive the links thereon and/or therebetween, such as respectively on teeth of a gear ring and/or in cavities of a nest wheel.

According to a preferred embodiment, the chain wheel also comprises resilient arms which are each connected close to a first end thereof to the body and connected close to a second end thereof to a protrusion corresponding thereto. A particular advantage of a chain wheel with such resilient arms is that a relatively great mutual distance can be realized between the arms, whereby the protrusions can adjust themselves over a relatively large distance range to an increase in the mutual distance between the chain links. The number of resilient arms preferably corresponds here to the number of protrusions.

According to a preferred embodiment, the protrusions and the body comprise mutually co-acting spring elements and receiving chambers for receiving the spring elements therein. Walls of each receiving chamber preferably engage opposite sides of the spring element received therein. The forces exerted by the chain links on the protrusions in the peripheral direction of the chain wheel are in this way compensated by resilience of the spring elements. The spring elements push here against the walls of the receiving chambers such that they produce sufficient reactive force to transmit the active force of a drive member on the chain wheel to the chain. A particular advantage of such a chain wheel provided with spring elements and receiving chambers is that, because of the different co-acting components, individual components such as a spring element or a protrusion can be replaced without the whole chain wheel or the whole body having to be replaced.

According to a preferred embodiment, the spring elements comprise a rubber plug, cup spring washers and/or die springs. Such spring elements have the particular advantage that they can exert a great force over a small spring travel, which makes them extremely suitable for adjusting a mutual protrusion distance of a chain wheel wherein the spring element produces sufficient reactive force to transmit the relatively great active force of a drive member on the chain wheel to the chain. It is noted that a cup spring washer comprises a shaped disc with a central hole so that it can be placed over a shaft. Owing to the shape the disc of a cup spring washer can compensate a displacement in axial direction. By stacking a plurality of cup spring washers great forces can be absorbed with a small overall movement.

The invention also provides a manure slide device for sliding manure over a floor of a manure passage and/or a manure gutter in or outside a livestock accommodation, comprising a slide member, a chain connected to the slide member and a chain wheel according to an embodiment of the present invention for receiving a part of the chain therein and/or thereon, configured such that a rotation of the chain wheel causes a translation of the slide member. Since great forces are exerted on such slide members, a particular advantage of such a manure slide device is that the protrusions of the chain wheel adjust themselves to the mutual distance between the chain links and at the same time produce sufficient reactive force by means of resilience to transmit the great active force of a drive member on the chain wheel to the chain.

The invention further provides a livestock accommodation comprising an accommodation floor with at least a manure passage and a manure slide device according to an embodiment of the present invention movable over the accommodation floor in the manure passage.

The invention will be further elucidated with reference to figures show in a drawing, wherein.

Figure 1A:
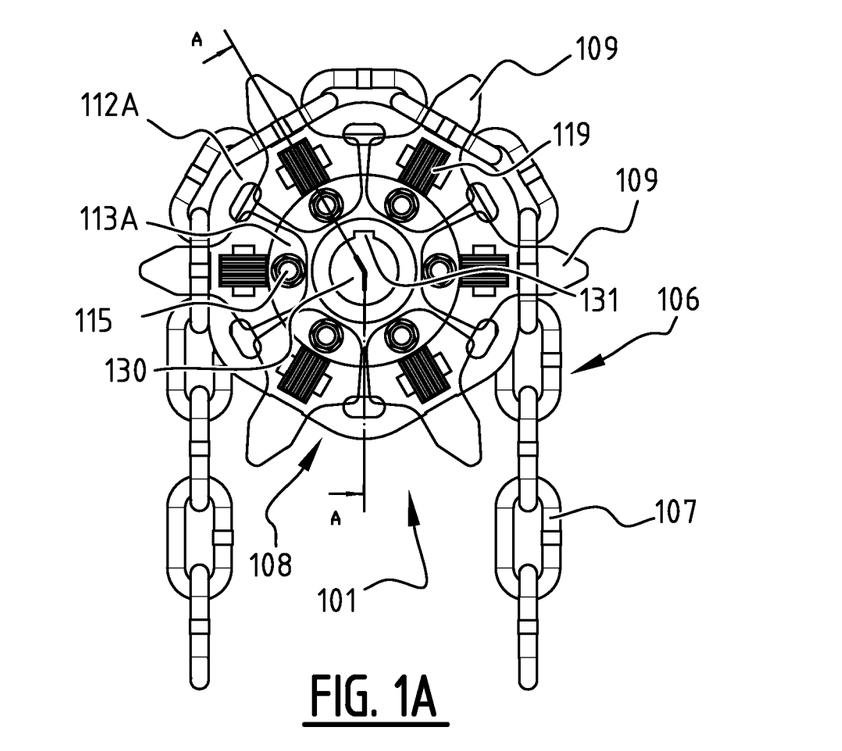
FIGS. 1A to 1D, 2A to 2E, 3A to 3E and 4A to 4E show various views of a chain wheel in different preferred embodiments of the invention.
Figure 1B:
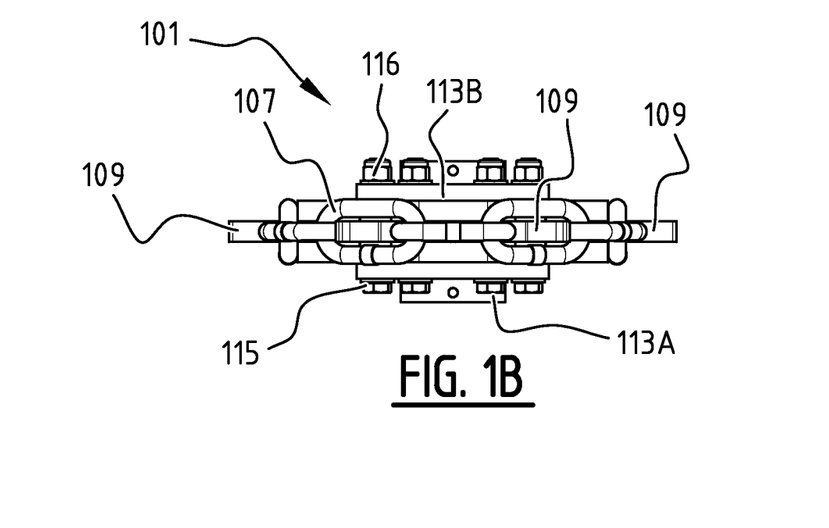
Figure 1C:
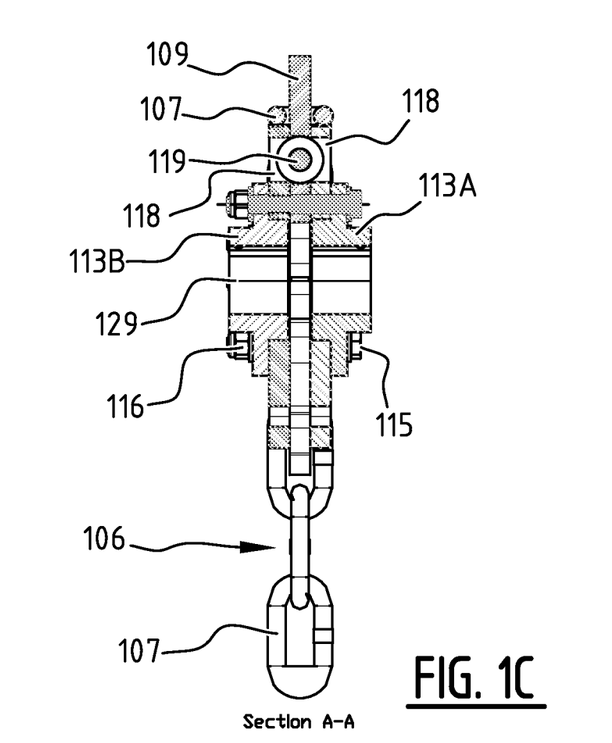
Figure 1D:
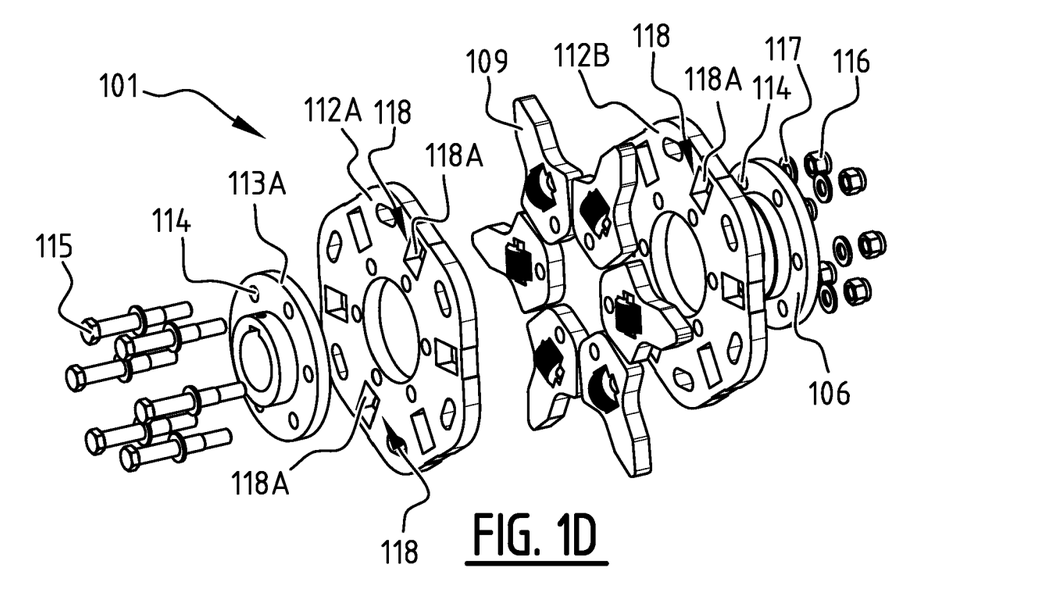
Figure 2A:
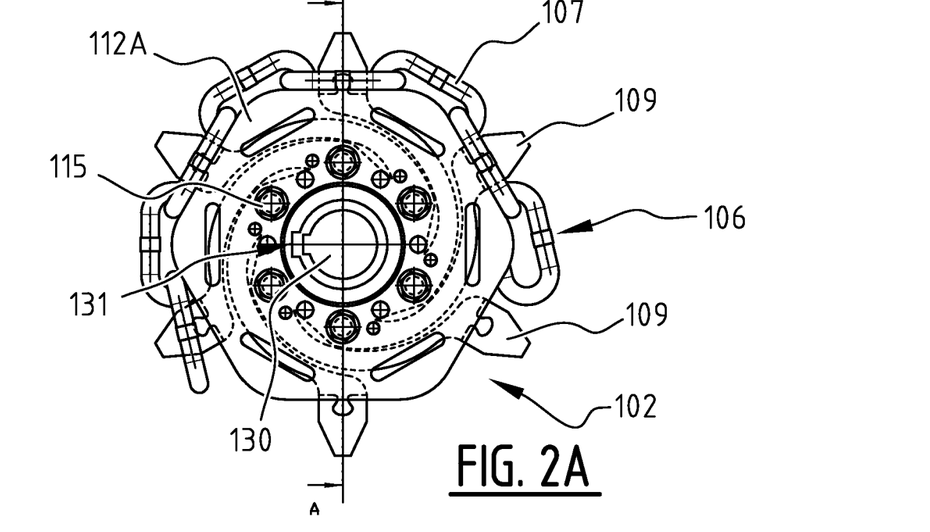
Figure 2B:
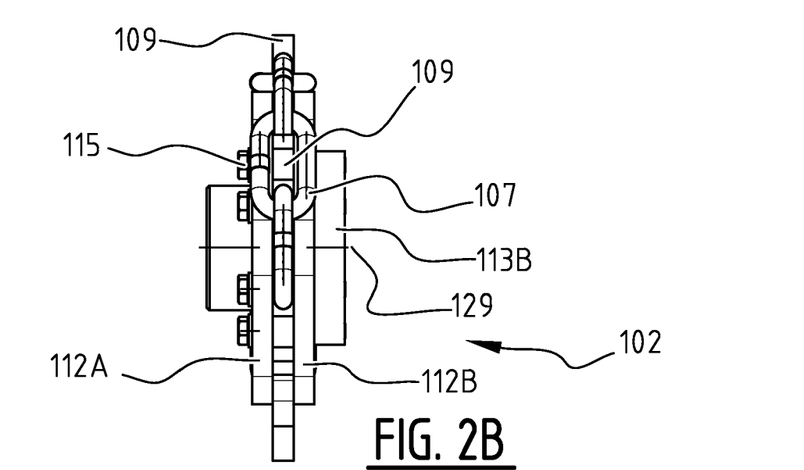
Figure 2C:
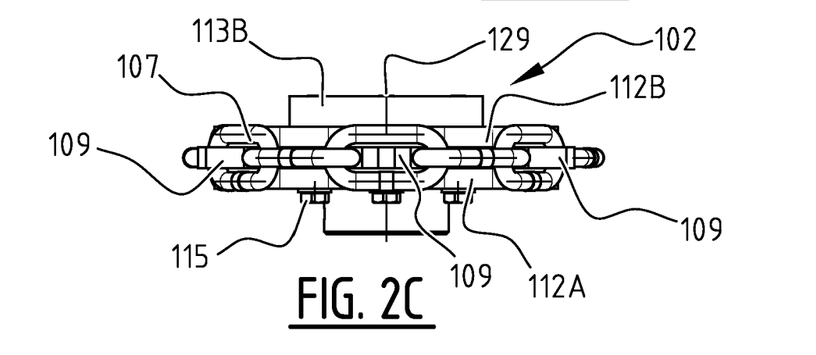
Figure 2D:
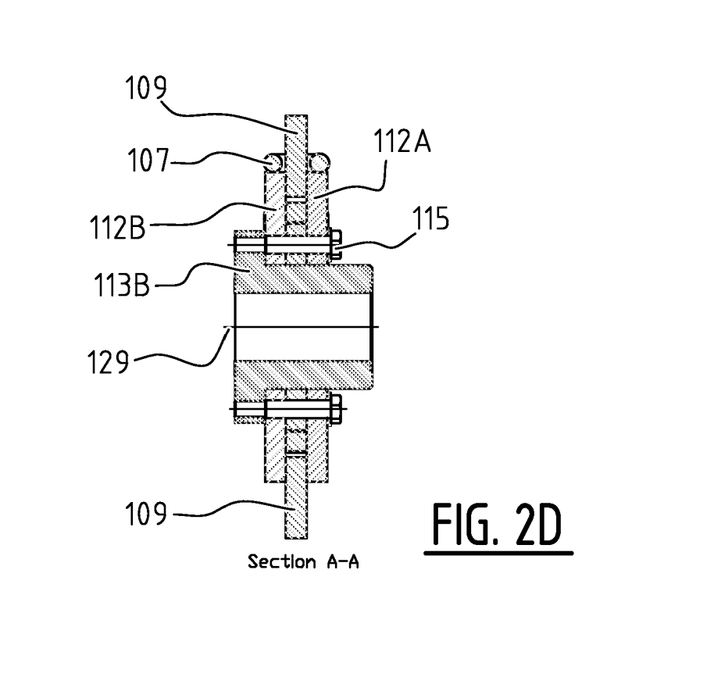
Figure 2E:
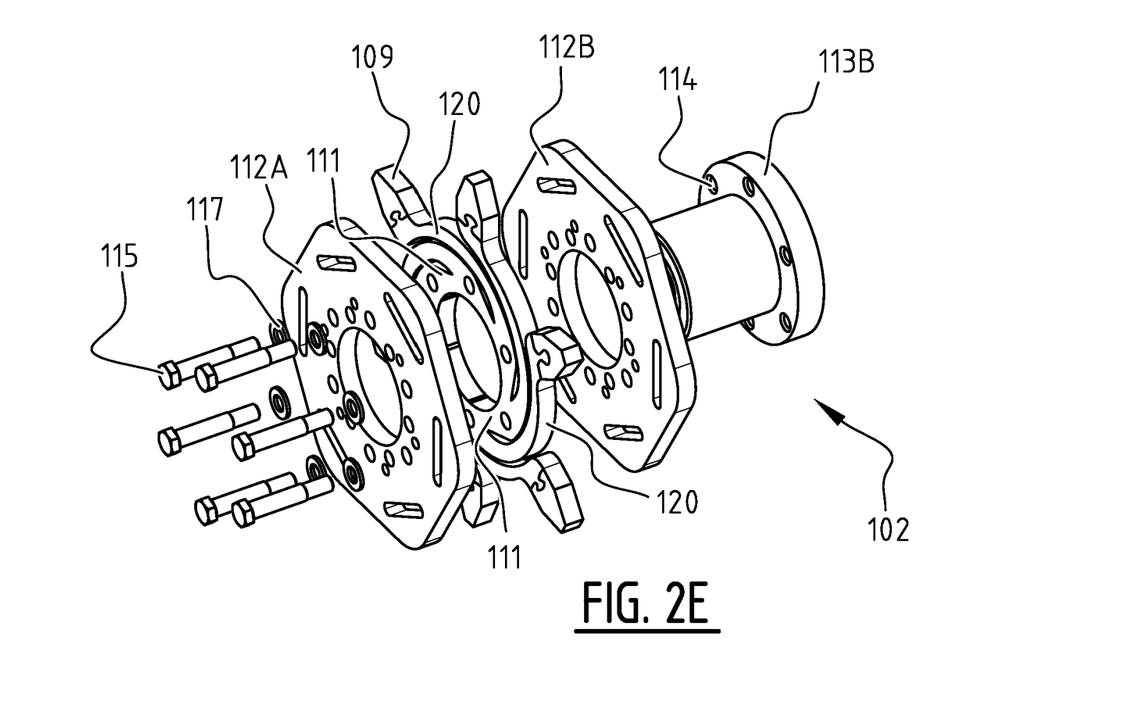
Figure 3A:
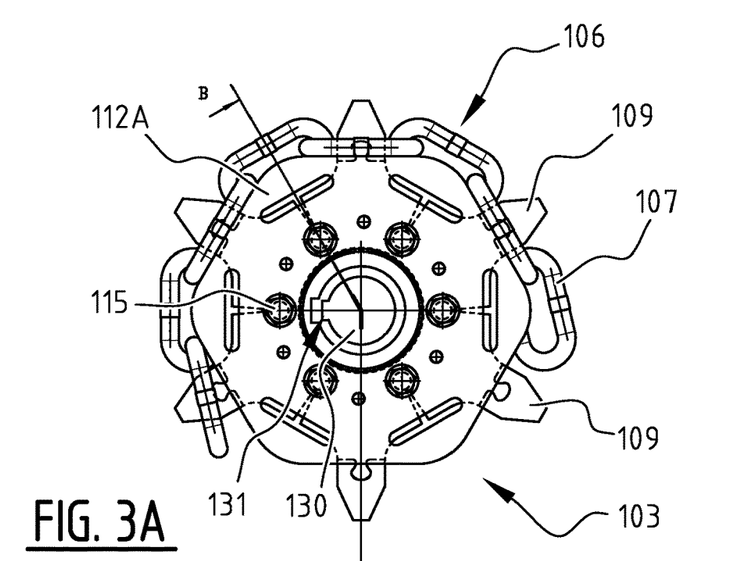
Figure 3B:
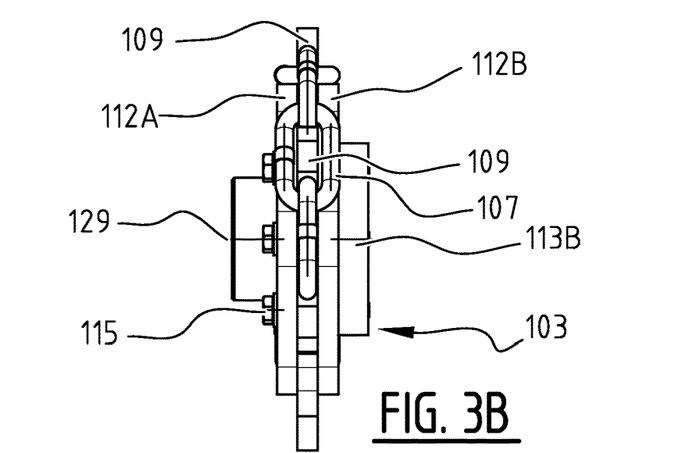
Figure 3C:
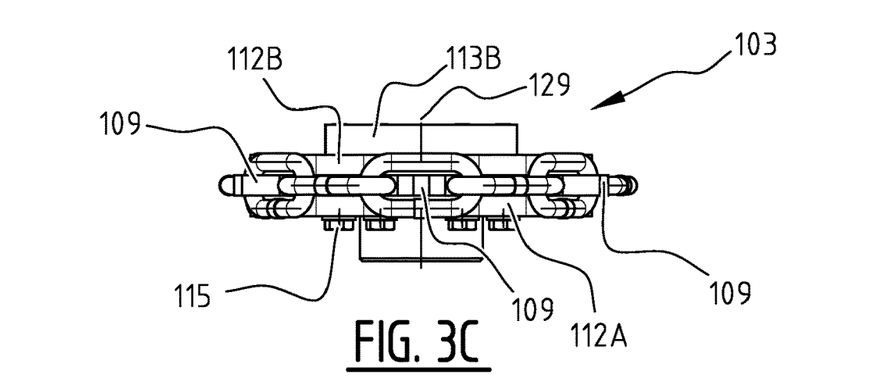
Figure 3D:
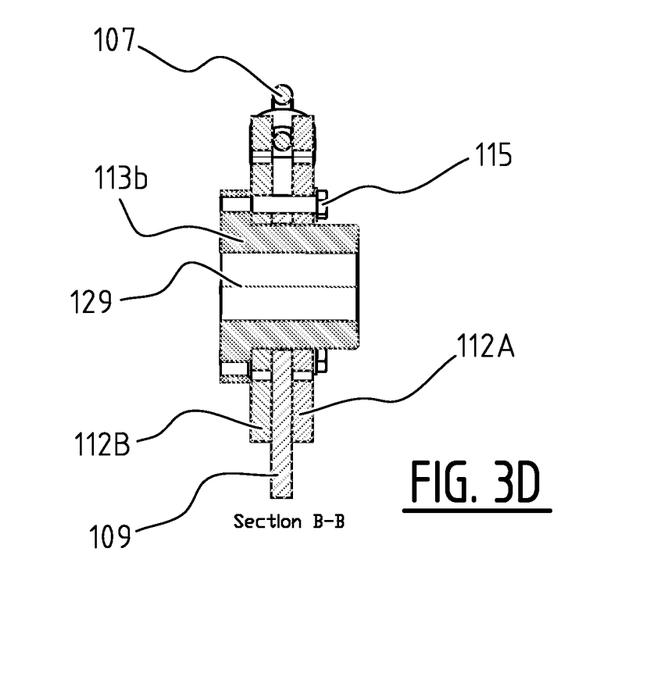
Figure 3E:
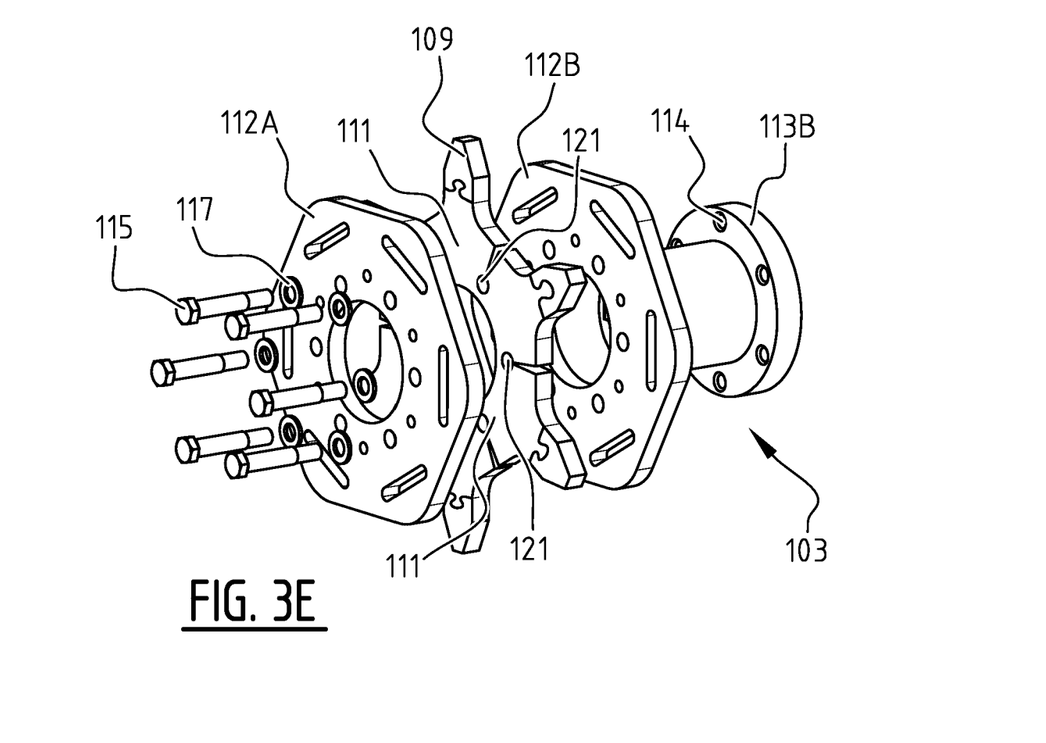
Figure 4A:
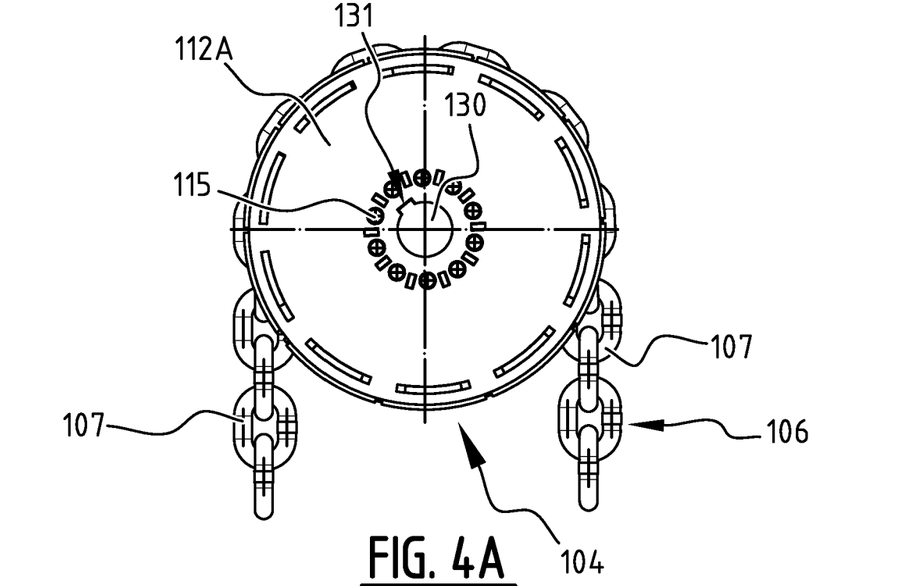
Figure 4B:
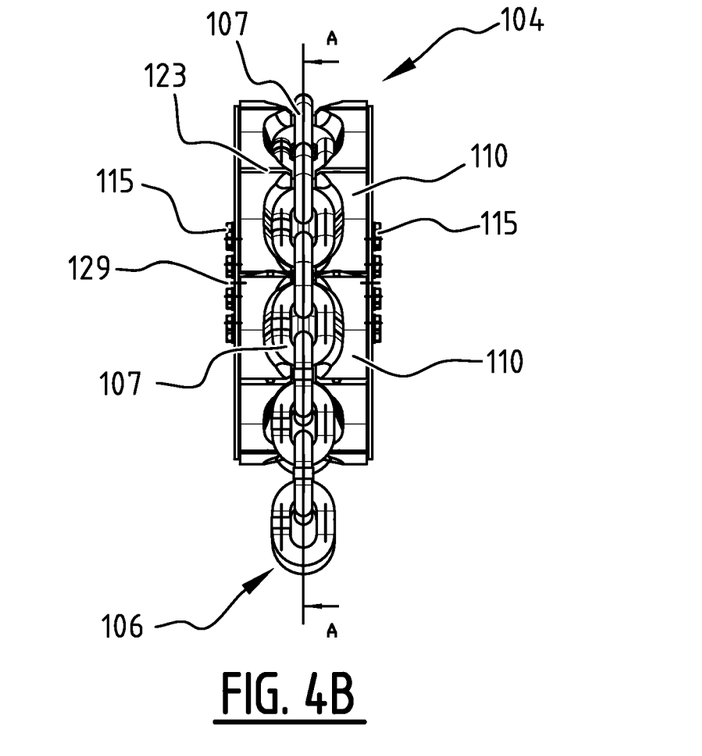
Figure 4C:
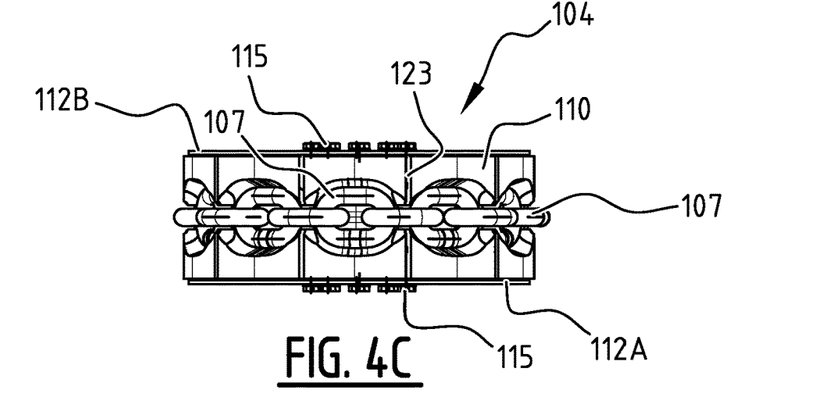
Figure 4D:
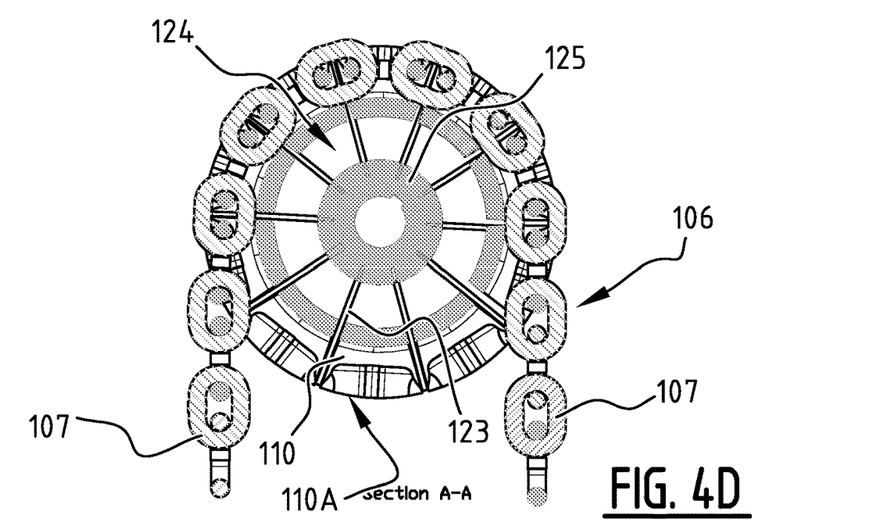
Figure 4E:
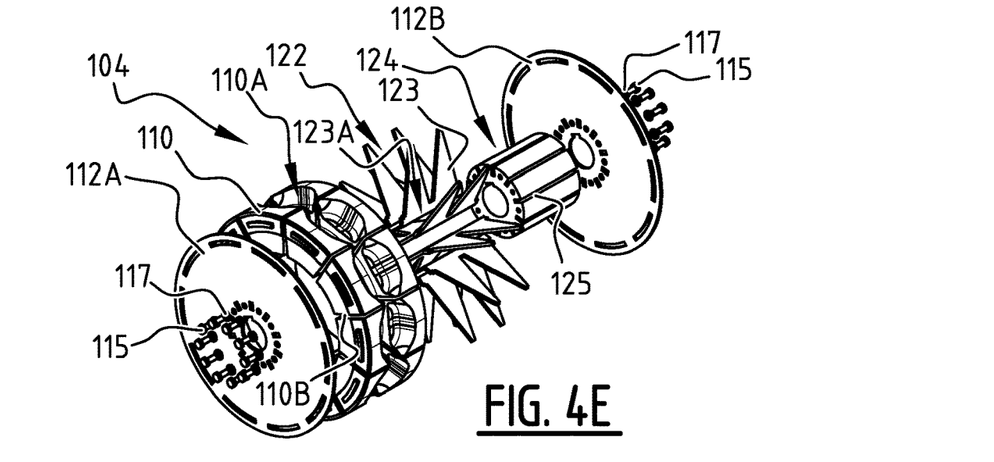
Figure 5A:
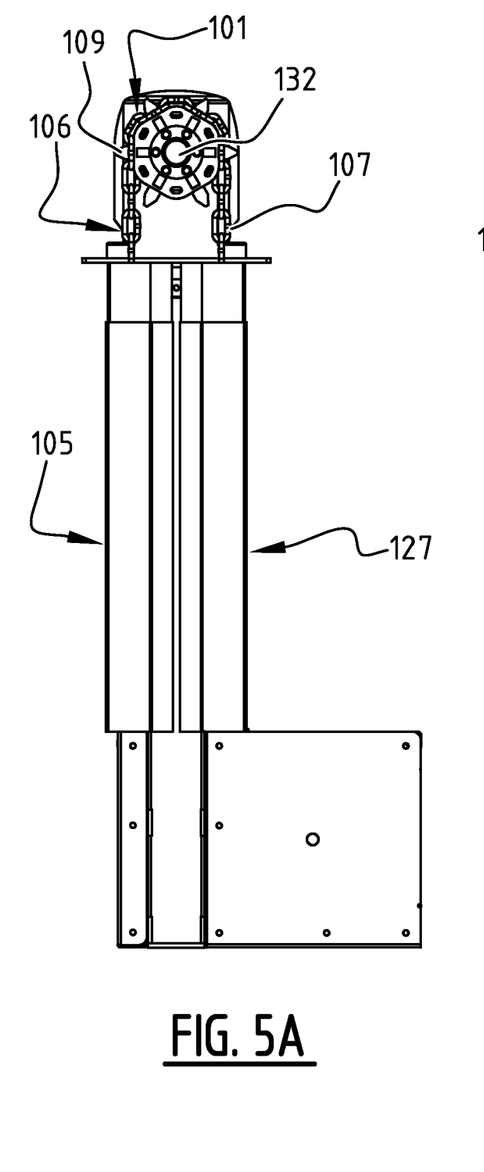
FIGS. 5A to 5D show various views of a drive device of a manure slide device in a preferred embodiment of the invention.
Figure 5B:
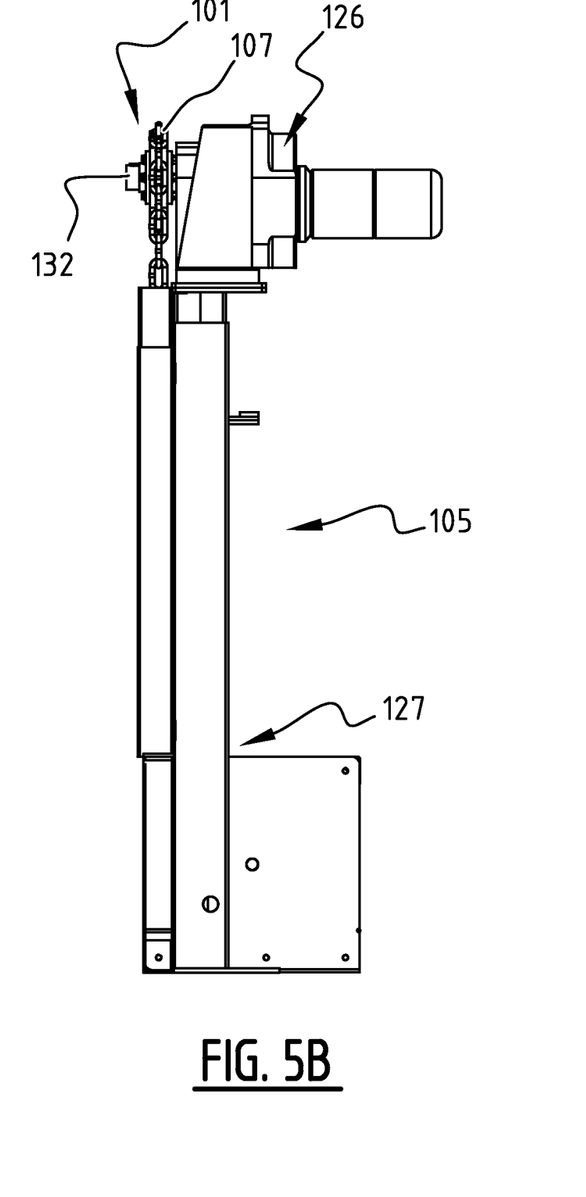
Figure 5C:
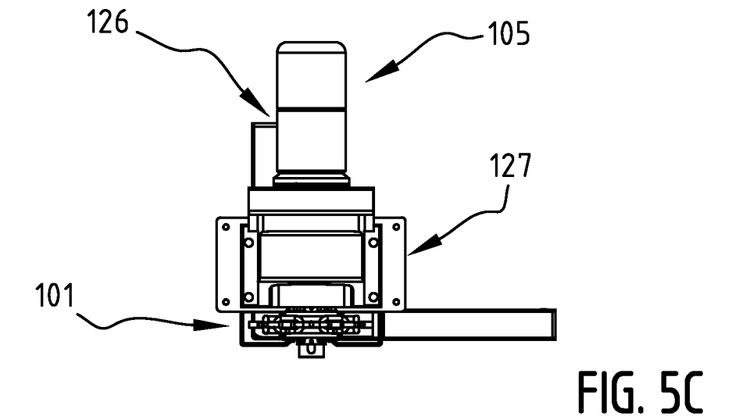
Figure 5D:
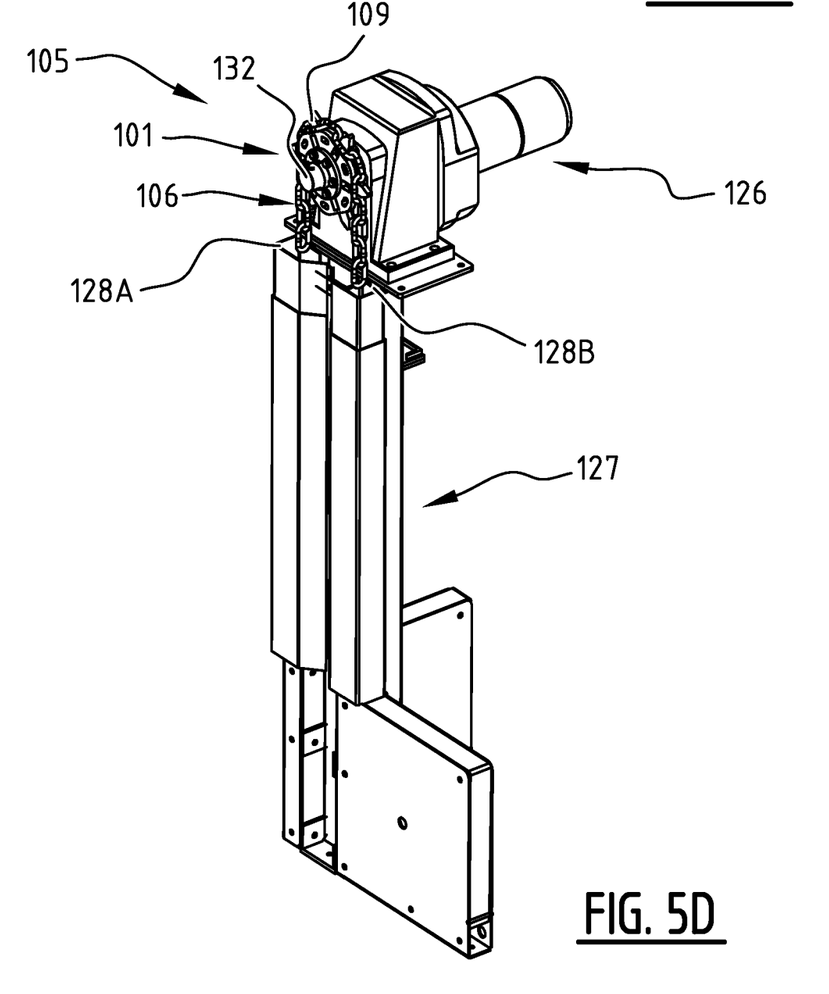

FIGS. 1A to 1D show respectively a front view, a top view, a cross-sectional side view and a perspective view of a preferred embodiment of a chain wheel according to the present invention. Shown particularly in FIGS. 1A to 1D is a chain wheel or gear ring 101 for driving links 107 of a chain 106. For this purpose links 107 are received by protrusions or teeth 109 of gear ring 101 extending radially outward relative to gear ring 101. It is noted for the sake of clarity that the links 107 of chain 106 are links with an opening plane extending perpendicularly of the radially outward oriented longitudinal direction of teeth 109, or links with an opening plane extending parallel to the tangential plane of the chain wheel, gear ring 101. A movement of chain links 170 is thus caused by a rotating movement of gear ring 101 about rotation axis 129. Each tooth 109 is spring-mounted independently of other teeth 109 in a peripheral direction of gear ring 101 relative to a body 108 of gear ring 101. Each tooth 109 of gear ring 101 is provided for this purpose with a spring element consisting of a stacked assembly of cup spring washers 119. Cup spring washers 119 are located partially in teeth 109 and protrude partially outside a front and rear surface of teeth 109. Although FIG. 1D shows cup spring washers 119 extending on either side of teeth 109, the invention likewise extends to variants wherein cup spring washers 119 protrude on only one side of teeth 109. The protruding portions of cup spring washers 119 are received in corresponding receiving chambers 118 in disc-like plates 112A and 112B which clamp teeth 109 with spring elements 119 on either side thereof. Receiving chambers 118 are designed such that cup spring washers 119 push against walls 118A of receiving chambers 118 such that they produce sufficient reactive force to transmit the active force of a drive member 126 (see among others FIG. 5D) via gear ring 101 to chain 106. Such a gear ring 101 provided with spring elements embodied as cup spring washers 119 and receiving chambers 118 has the important advantage that individual components, such as cup spring washers 119 or individual teeth 109, can be replaced without the whole gear ring 101 or the whole body 108 having to be replaced. It is otherwise noted that other types of spring element can also be applied, such as rubber plugs and/or die springs. Arranged on sides of disc-like plates 112A and 112B remote from teeth 109 are flanges 113A and 113B which are provided in a centre thereof with a hole 130 with one or more recesses 131 provided in the peripheral wall thereof in order to receive rotationally locked therein a shaft 132, such as a spline shaft, having respectively one or more splines of an optionally motor-driven drive member 126 which are optionally arranged extending on shaft 132 in the longitudinal direction of shaft 132. Teeth 109 with cup spring washers 119 and disc-like plates 112A and 112B with the receiving chambers 118 provided therein as well as flanges 113A and 113B are held together by mutually co-acting bolts 115 and nuts 116 which are inserted through holes 114 optionally provided with screw thread in flanges 113A and 113B, disc-like plates 112A and 112B and teeth 109 and screwed to each other. Bolts 115 also function as pivot pin for teeth 109 of gear ring 101. Rings 117 can optionally be placed between flange 113A and the heads of bolts 115 and/or between flange 113B and nuts 116. The gear ring 101 shown in FIGS. 1A to 1D has six teeth distributed at equal angles along its periphery and disc-like plates 112A and 112B take a correspondingly hexagonal form. It is however noted that gear ring 101 according to the invention can comprise an arbitrary number of teeth 109.

FIGS. 2A to 2E show respectively a front view, a side view, a top view, a cross-sectional side view and a perspective view of a preferred embodiment of a chain wheel according to the present invention. Similarly to FIGS. 1A to 1D, FIGS. 2A to 2E show a chain wheel or gear ring 102 with protrusions or teeth 109 connected releasably to a body 108 and spring-mounted independently of each other in a peripheral direction relative to the body 108. The embodiment of FIGS. 2A to 2E is distinguished from that of FIGS. 1A to 1D in that the relative movement between teeth 109 and the resilience thereof is brought about by arms 120 of a resilient material in curved form which are specially designed for the application in a gear ring 102 and which are fixedly connected at outer ends thereof to a body part 111 and on which the teeth 109 of gear ring 102 are releasably arranged at free opposite outer ends thereof. Depending on the change in pitch of links 107 of chain 106 induced by wear, teeth 109 can adjust their position relative to each other in the peripheral direction such that the local pitch between two adjacent teeth 109 corresponds to the pitch between links 107 lying thereon through movement of the curved arms 120 in the peripheral direction of gear ring 102.

FIGS. 3A to 3E show respectively a front view, a side view, a top view, a cross-sectional side view and a perspective view of a preferred embodiment of a chain wheel according to the present invention. Similarly to FIGS. 2A to 2E, FIGS. 3A to 3E show a chain wheel or gear ring 103 with protrusions or teeth 109 connected releasably to a body 108 and spring-mounted independently of each other in a peripheral direction relative to the body 108, wherein teeth 109 are manufactured integrally with a body part 111. The embodiment of FIGS. 3A to 3E is distinguished from that of FIGS. 2A to 2E in that the relative movement between teeth 109 and the resilience thereof is brought about by recesses 121 specially designed for the purpose and extending radially inward between mutually adjacent teeth 109. Close to body part 111 these recesses 121 are formed such that the shape thereof and the material exert a spring force which is opposed to the movement of a tooth 109 in peripheral direction of gear ring 103. Recesses 121 and the material of body part 111 with releasable teeth 109 therefore provide space for movement for, as well as spring force of, teeth 109 of gear ring 103.

FIGS. 4A to 4E show respectively a front view, a side view, a top view, a cross-sectional front view and a perspective view of a preferred embodiment of a chain wheel according to the present invention. Shown particularly in FIGS. 4A to 4E is a nest wheel 104 for driving links 107 of a chain 106. Links 107 are for this purpose received in cavities, or nest chambers 110A of nests 110 of nest wheel 104. It is noted that links 107 of chain 106 are here links with an opening plane which extends parallel to the tangential plane of nest wheel 104. A movement of chain links 107 is thus caused by a rotating movement of nest wheel 104 about rotation axis 129. Great forces can be transmitted substantially without slip by means of such a transmission. Nests 110 are likewise spring-mounted independently of each other in a peripheral direction of nest wheel 104 relative to a body 108 of nest wheel 104. Nest wheel 104 comprises for this purpose a resilient body 122 with radially outward extending resilient blades 123 placed apart at equal angles with intermediate spaces 123A. Resilient blades 123 of resilient body 122 are mounted releasably or otherwise in resilient blade recesses 125 of a cylindrical foot 124. Free ends of the resilient blades are then placed in intermediate spaces 110B between nests 110 of nest wheel 104 so that nests 110 of nest wheel 104 can move resiliently relative to body 108 in a peripheral direction of nest wheel 104 in order to adjust to a changing pitch between adjacent chain links 107, and at the same time produce sufficient reactive force to transmit the drive force of a drive member 126 to chain 106. A nest wheel 104 provided with spring elements embodied as resilient blades 123 and individually releasable nests 110 has the important advantage that individual components, such as resilient blades 123/resilient body 122 or individual nests 110, can be replaced without the whole nest wheel 104 or the whole body 108 having to be replaced. Likewise arranged on either side of nests 110 are disc-like plates 112A and 112B between which nests 110 are clamped and fixed by means of bolts 115 and nuts 116. Bolts 115 likewise function as pivot pin for nests 110 of nest wheel 104. Rings 117 can optionally be placed between disc-like plates 112A and 112B and the heads of bolts 115. The cylindrical foot 124 and disc-like plates 112A and 112B are provided in a centre thereof with a hole 130 with one or more recesses 131 provided in the peripheral wall thereof in order to receive rotationally locked therein a shaft 132, such as a spline shaft, having respectively one or more splines of an optionally motor-driven drive member 126 which are optionally arranged extending on shaft 132 in the longitudinal direction of shaft 132. The nest wheel 104 shown in FIGS. 4A to 4E has ten nests 110 distributed at equal angles along its periphery. It is however noted that nest wheel 104 according to the invention can comprise an arbitrary number of nests 110.

FIGS. 5A to 5D show respectively a front view, a side view, a top view and a perspective view of a preferred embodiment of a part of a drive 105 of a manure slide device according to the present invention. Shown particularly in FIGS. 5A to 5D is a gear ring 101 with releasable teeth 109 movable resiliently independently of each other in a peripheral direction of gear ring 101. Gear ring 101 is driven by a motor 126 and in turn drives a chain 106, whereby links 107 of chain 106 are moved. Chain links 107 move through passages 128A and 128B of a housing 127 of a part of manure slide device 105 in the direction of a floor of a livestock accommodation, where chain 106 bends at a right angle and is subsequently moved parallel to the floor, optionally in a channel in the floor. Connected releasably to an outer end of chain 106 is a manure slide for pushing manure along through a manure passage of the livestock accommodation. A revolving movement of a shaft 132 of the motor is thus converted to a translation of the manure slide in efficient manner and substantially without slip. Because teeth 109 of gear ring 101 move resiliently independently of each other, the force applied by teeth 109 to chain links 107 is distributed uniformly over teeth 109, whereby wear to links 107 and teeth 109 is reduced, and a correct accommodation of links 107 on teeth 109 and/or in nests 110 is guaranteed.

It is noted that the present invention is not limited to the drawn embodiments but also extends to other preferred variants falling within the scope of the appended claims.

The invention claimed is:

1. A chain wheel comprising:
   a body, and
   protrusions extending outward along the periphery of the body for receiving links of a chain,
   wherein the protrusions are connected releasably to the body and are spring-mounted independently of each other in a peripheral direction relative to the body;
   wherein the protrusions and the body comprise mutually co-acting spring elements and receiving chambers for receiving the co-acting spring elements therein; and
   wherein the co-acting spring elements comprise cup-spring washers.

2. The chain wheel as claimed in claim 1, wherein the protrusions are configured to receive the links at least one of thereon and therebetween.

3. The chain wheel as claimed in claim 1, wherein walls of each receiving chamber engage opposite sides of the spring element received therein.

4. A manure slide device for sliding manure over a floor of at least one of a manure passage and a manure gutter in or outside a livestock accommodation, comprising:
   a slide member,
   a chain connected to the slide member, and
   a chain wheel as claimed in claim 1 for receiving a part of the chain at least one of therein and thereon, configured such that a rotation of the chain wheel causes a translation of the slide member.

5. A livestock accommodation comprising an accommodation floor with at least a manure passage and a manure slide device as claimed in claim 4, which is movable over the accommodation floor in the manure passage.

6. The chain wheel as claimed in claim 1, wherein the body further comprises first and second disc-like plates that clamp said protrusions on either side thereof.

7. The chain wheel as claimed in claim 6, wherein said first and second disc-like plates include receiving chambers for receiving said co-acting spring elements therein.

8. The chain wheel as claimed in claim 1, wherein said co-acting cup-spring washers comprise a stacked assembly of cup spring washers.

9. The chain wheel as claimed in claim 1, wherein protruding portions of said cup spring washers are received in corresponding receiving chambers in disc-like plates of said body which clamp said protrusions therebetween.

* * * * *